United States Patent [19]

Doniwa

[11] 4,381,482
[45] Apr. 26, 1983

[54] SINGLE-PHASE, REVERSIBLE INDUCTION MOTOR

[75] Inventor: Tabito Doniwa, Atsugi, Japan

[73] Assignee: Daiichi Dentsu Kabushiki Kaisha, Japan

[21] Appl. No.: 227,672

[22] Filed: Jan. 23, 1981

[30] Foreign Application Priority Data

Mar. 14, 1980 [JP] Japan .................. 55-31544

[51] Int. Cl.$^3$ .......................................... H02K 16/02
[52] U.S. Cl. .................. 318/816; 310/212; 310/112; 318/754
[58] Field of Search .......... 318/830, 754, 816; 310/212, 112

[56] References Cited

U.S. PATENT DOCUMENTS

| 524,534 | 8/1804 | Stanley, Jr. | 318/816 |
| 1,638,338 | 9/1912 | Fynn | 318/816 |
| 1,913,208 | 6/1963 | Morrill | 318/754 |
| 2,242,010 | 5/1941 | MacMillan | 310/212 |
| 2,292,167 | 8/1942 | Smith | 310/212 |
| 3,017,553 | 1/1962 | Homan | 310/112 |
| 3,144,597 | 8/1964 | Lee | 318/816 |
| 3,496,397 | 2/1970 | Andresen | 310/212 |
| 3,524,288 | 5/1966 | Hutson | 310/212 |

Primary Examiner—David Smith, Jr.

Attorney, Agent, or Firm—Robert E. Burns; Emmanuel J. Lobato; Bruce L. Adams

[57] ABSTRACT

A single-phase, reversible induction motor, comprising two cylindrical rotors disposed side by side on the same axis of rotation, the rotors being composed of laminated iron cores and provided with grooves of the same number disposed in parallel with the shaft and on respective surfaces of the cylindrical rotors at regular intervals; two two-pole field systems respectively composed of laminated iron cores and surrounding the rotors, and coils for exciting the field systems, respectively, the field systems and the coils being arranged so that the directions of passage through the rotors of magnetic fluxes emanating therefrom be perpendicular to each other; and a switching circuit for reversing the phase of a single-phase alternating current supplied to one of the coils. Conductors of a magnetically permeable material are fixedly secured to all the grooves of one of the rotors but electrically isolated from the rotor iron core. Conductors of a non-magnetically-permeable material are fixedly secured to all the grooves of the other rotor but electrically isolated from the rotor iron core. Corresponding conductors of the two rotors are interconnected at one ends for each groove and connected at the other ends to respective conductor rings for common connection use.

7 Claims, 7 Drawing Figures

SINGLE-PHASE, REVERSIBLE INDUCTION MOTOR

FIELD OF THE INVENTION

The present invention relates to the structure of a single-phase, reversible induction machine (hereinafter referred to as a motor) which is capable of both forward rotation and backward rotation and is small and lightweight.

BACKGROUND OF THE INVENTION

Of relatively small, single-phase induction motors, a shading coil type induction motor is the simplest in construction but not capable of reversible rotation. In general, it is a condenser type induction motor (a condenser motor) that is widely employed as a single-phase, AC reversible motor with an output of less than 1 kW, but this type of motor requires a large condenser to be mounted on the outside thereof; this inevitably leads to a bulky and heavy structure and, in addition, poses problems of the selection of a position for mounting the condenser and of increasing the manufacturing cost.

SUMMARY OF THE INVENTION

An object of the present invention is to provide a motor which is mounted as a driving source on each of a variety of apparatus and which can easily be driven in forward and backward directions by a single-phase, AC power source without requiring any external parts such as a condenser and so forth.

BRIEF DESCRIPTION OF THE ACCOMPANYING DRAWINGS

The principle, construction and operation of this invention will be clearly understood from the following detailed description taken in conjunction with the accompanying drawings, in which.

DETAILED DESCRIPTION OF THE INVENTION

Figure 1:
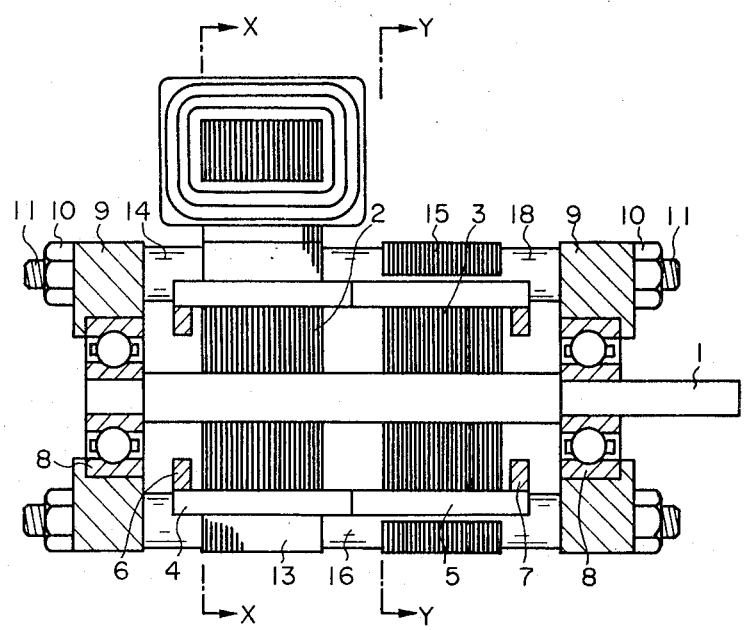
FIG. 1 is a sectional view showing an example of a single-phase, induction motor embodying the present invention.
Figure 2:
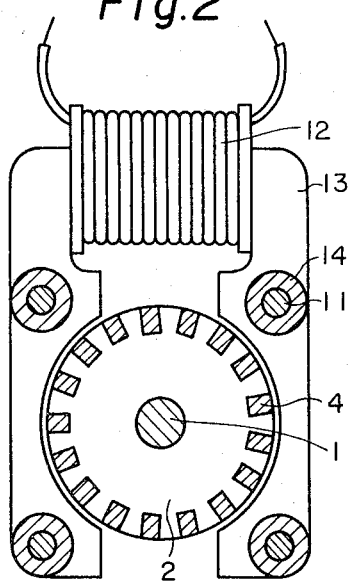
FIG. 2 is a sectional view taken on a plane X—X in FIG. 1.
Figure 3:
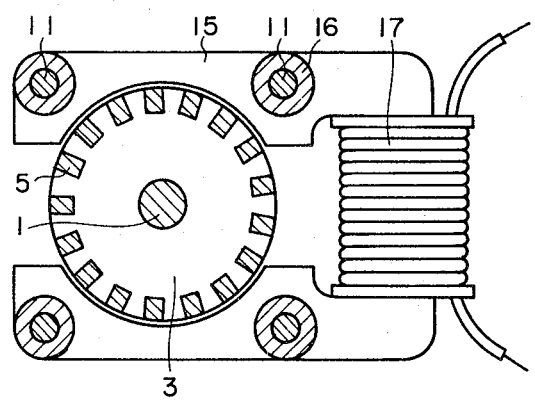
FIG. 3 is a sectional view taken on a plane Y—Y in FIG. 1.

In FIGS. 1 to 3, reference numeral 1 indicates a rotor steel shaft; 2 and 3 designate cylindrical rotors respectively composed of laminated iron cores which are provided with conductor-receiving grooves of the same number disposed in parallel with the shaft 1 and on respective surfaces of the cylindrical rotors 2 and 3 at regular intervals; 4 identifies rotor conductors made of magnetically permeable material, such as copper; 5 denotes rotor conductors made of a magnetically-non permeable material, such as pure iron; 6 and 7 represent terminating copper rings for connecting together the rotor conductors 4, 5 to set up respective closed circuits; 8 shows ball bearings for supporting the rotor 1; 9 refers to support plates of a material other than steel employed for the bearings 8; 10 indicates nuts; 11 designates four bolts for fixing the support plate 9—a field pole 13—a field pole 15—the support plate 9, as shown; 12 identifies a coil for exciting the field pole 13; 13 and 15 denote field poles; 14 represents spacers disposed between the support plate 9 and the field pole 13; 16 shows spacers diposed between the field pole 13 and 15; 17 refers to a coil for exciting the field pole 15; and 18 indicates spacers disposed between the field pole 15 and the support plate 9.

In the motor of the present invention, as shown in FIG. 1, two rotors 2 and 3 respectively composed of laminated iron cores are disposed side by side in the direction of the rotary shaft 1. In the grooves 1 of the rotor 2, conductors 4 of a permeable material are fixedly secured to the rotor cores but electrically isolated therefrom, and in the grooves of the other rotor 3, conductors 5 of a non-permeable material are likewise fixedly secured to the cores but electrically isolated therefrom. The conductors of the two rotors aligned for each corresponding grooves are joined together by an adhesive binder or by welding at their adjacent ends to form a unitary structure with each other, and the thus interconnected conductors 4, 5 are connected at their ends to the circular conductor rings 6 and 7 so that they establish an associated closed circuit (loop circuits) at their outer ends in the axial direction of the iron cores. Further, as shown in FIGS. 2 and 3, the two-pole field systems 13 and 15 each composed of two laminated iron cores, and the exciting coils 12 and 17 therefor are provided respectively in correspondence to the rotors 2 and 3 in such a manner that magnetic fields established by the two field systems, that is, the coils 12 and 17 may intersect each other at right angles.

Next, a description will be given of the operating principle of the motor shown in FIG. 1. If the conductors of the rotor 2 are formed of the same non-magnetic material as the conductors of the rotor 3, and if alternating currents of the same phase are applied to the coils 12 and 17, no torque is generated for the reason given blow. Applying an alternating current to the coil 12 of the one field pole 13, a current is induced by electromagnetic induction in the conductors 4 of the rotor 2, but since the conductors 4 and 5 of the rotors 2 and 3 are interconnected to each other, the current induced in the conductors 4 flows also in the conductors 5 and, by the current to the coil 17 which is in phase with the current applied to the coil 12, the field pole 15 is excited and, in the rotor conductors 5 a torque is generated by an electromagnetic force. On the other hand, a current is induced in the rotor conductors 5 by the electromagnetic inducing action of the field pole 15 and this induced current also flows in the conductors 4. As a consequence, by the electromagnetic force acting with the field pole 13, a torque is produced in the rotor conductors 4 which is equal in value but opposite in direction to the torque in the rotor conductors 5, and these torques are cancelled with each other, resulting in no torque being yielded.

Figure 4:
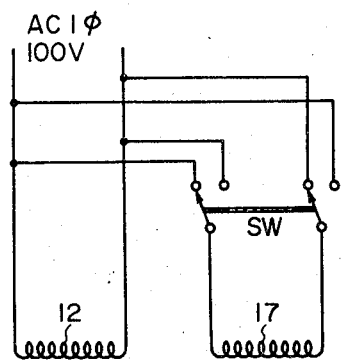
FIG. 4 is a diagram showing an example of a reversible switching circuit of the motor.
Figure 5B:
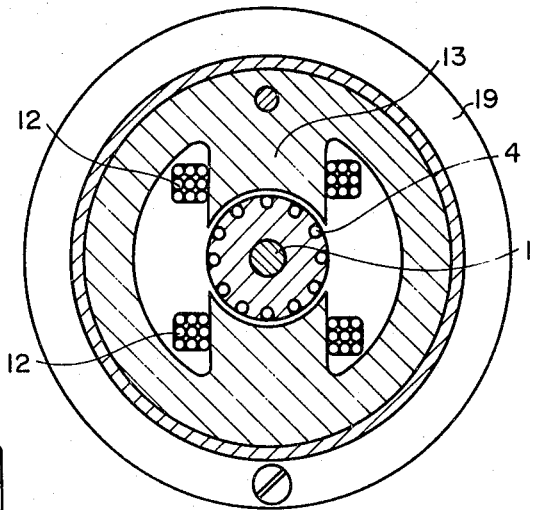
FIG. 5B is a sectional view along a plane X—X in FIG. 5A.
Figure 5A:
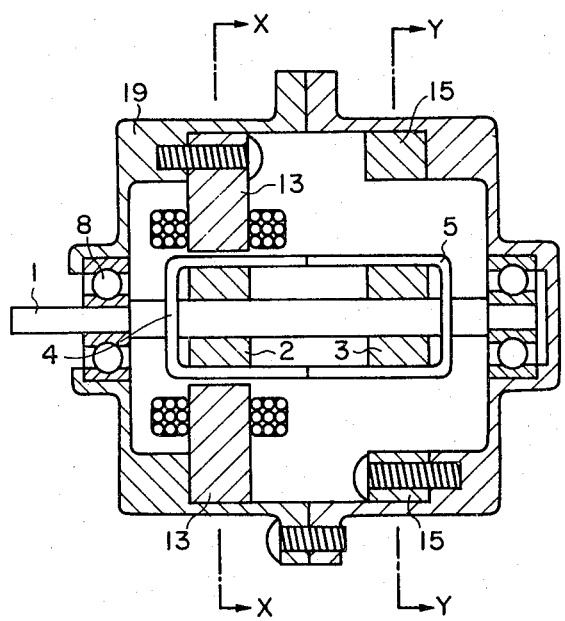
FIG. 5A illustrates in section the construction of a single-phase, reversible induction motor, showing another embodiment of the present invention.
Figure 5C:
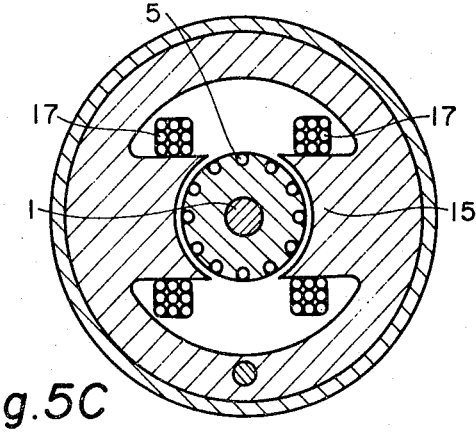
FIG. 5C is a sectional view along a plane Y—Y in FIG. 5A.

In contrast thereto, in the present invention, the conductors 4 of the one rotor 2 alone are formed of the magnetically permeable material to provide for increased leakage reactance, by which the current induced in the conductors 4 can be made smaller than the current induced in the non-magnetic conductors 5 of the rotor 3. Since this destroys the balance between the torques of opposite directions which are produced in the rotor conductors 4 and 5, there can be obtained an induction motor which is driven by the supply of a single-phase AC power source. Further, it has sufficiently been ascertained by experiments that the induction motor serves as a single-phase, reversible induction motor of the type in which its direction of rotation, that is, the direction of rotation of the shaft 1 can be switched to one of the forward and backward directions by switching the currents supplied to the field coils 12 and 17 to the in-phase mode or the out-of-phase mode by means of a switch SW, as shown in FIG. 4. The field poles 13 and 15 need not always be of such rectangular configurations as shown in FIGS. 2 and 3 but may also be circular or some other suitable configurations, such as depicted in FIGS. 5A, 5B and 5C which illustrate another embodiment of the present invention. FIG. 5A is a sectional view corresponding to FIG. 1 and FIGS. 5B and 5C illustrate in section the field systems and the rotors in correspondence to FIGS. 2 and 3. In this embodiment, the motor is housed in a case 19. The outer ends of the rotor conductors 4 and 5 are connected to the outer end of corresponding conductors 4 and 5 oppositely positioned.

What I claim is:

1. A single-phase, reversible induction motor comprising: two cylinderical rotors disposed side by side on the same axis of rotation, the rotors being composed of laminated iron cores and provided with grooves of the same number disposed in parallel with the shaft and on respective surfaces of the cylindrical rotors at regular intervals; two two-pole field systems respectively composed of laminated iron cores and surrounding the rotors, and coils for exciting the field systems, respectively, the field systems and the coils being arranged so that the directions of passage through the rotors of magnetic fluxes emanating therefrom be perpendicular to each other; a switching circuit for reversing the phase of a single-phase alternating current supplied to one of the coils; conductors of a magnetically permeable material fixedly secured to all the grooves of one of the rotors but electrically isolated from the rotor iron core; and conductors of a magnetically-non-permeable material are fixedly secured to all the grooves of the other rotor but electrically isolated from the rotor iron core, corresponding conductors of the two rotors being interconnected at one ends for each groove and connected at the other ends to respective conductors for common connection use.

2. A single-phase, reversible induction motor according to claim 1, in which said corresponding conductors of the two rotors are connected at the other ends to respective conductor rings.

3. A single-phase, reversible induction motor according to claim 1, in which said corresponding conductors of the two rotors are connected at the other ends to the other ends of opposite ones of said corresponding conductors.

4. In a single-phase reversible induction motor, the combination comprising: a rotor shaft; a pair of cylindrical rotors mounted on said rotor shaft for rotation therewith and positioned adjacent to each other, each of said cylindrical rotors having the same number of surface grooves extending parallel to said rotor shaft along the length of said rotors, spaced circumferentially of said rotors at regular intervals and positioned to define pairs of aligned grooves each on a respective one of said rotors; means for defining two magnetic pole pairs each surrounding a respective one of said rotors and each generating an alternating magnetic field perpendicular to the magnetic field of the other pole pair, said means for defining two magnetic pole pairs comprising phase reversing means for reversing the phase of the magnetic field from one pole pair relative to the phase of the magnetic field from the other pole pair; conductive strips of magnetically permeable material fixed in respective grooves of one of said rotors and electrically isolated from said one of said rotors; and conductive strips of magnetically non-permeable material fixed in respective grooves of the other of said rotors and electrically isolated from the other of said rotors, wherein respective conductive strips within each pair of aligned rotor surface grooves are connected at their facing adjacent ends.

5. In a single phase reversible induction motor according to claim 4, said pair of rotors are comprised of laminated iron.

6. In a single phase reversible induction motor according to claim 4 or 5, a pair of conductive rings each for connecting together the conductive strips on a respective one of said rotors at the ends of the conductive strips opposite the other of said rotors.

7. In a single phase reversible induction motor according to claim 4 or 5, means for connecting together the remote ends of the pair of conductive strips in each pair of aligned rotor surface grooves.

* * * * *